(12) United States Patent
Morikawa

(10) Patent No.: US 7,826,164 B2
(45) Date of Patent: Nov. 2, 2010

(54) CONTACT TYPE THIN FILM MAGNETIC HEAD WITH HEATERS FOR DISTANCE CONTROL

(75) Inventor: Satoshi Morikawa, Niigata-ken (JP)

(73) Assignee: TDK Corporation, Tokyo (JP)

( * ) Notice: Subject to any disclaimer, the term of this patent is extended or adjusted under 35 U.S.C. 154(b) by 553 days.

(21) Appl. No.: 11/558,330

(22) Filed: Nov. 9, 2006

(65) Prior Publication Data

US 2007/0109687 A1    May 17, 2007

(30) Foreign Application Priority Data

Nov. 16, 2005    (JP) .............................. 2005-332098

(51) Int. Cl.
*G11B 21/02* (2006.01)
*G11B 5/127* (2006.01)
(52) U.S. Cl. ...................... 360/75; 360/125.1
(58) Field of Classification Search .................. 360/75, 360/125.31, 125.74, 237.1
See application file for complete search history.

(56) References Cited

U.S. PATENT DOCUMENTS

| | | | |
|---|---|---|---|
| 6,963,464 B2 * | 11/2005 | Xu et al. ...................... 360/75 |
| 7,400,473 B1 * | 7/2008 | Krajnovich et al. ...... 360/294.7 |
| 2003/0174430 A1 * | 9/2003 | Takahashi et al. ............. 360/75 |
| 2004/0190203 A1 | 9/2004 | Albrecht et al. |
| 2006/0187583 A1 * | 8/2006 | Lou et al. .................... 360/128 |

FOREIGN PATENT DOCUMENTS

| | | |
|---|---|---|
| JP | 2004-241092 | 8/2004 |
| JP | 2004-296072 | 10/2004 |

* cited by examiner

*Primary Examiner*—Joseph H Feild
*Assistant Examiner*—Gustavo Polo
(74) *Attorney, Agent, or Firm*—Brinks Hofer Gilson & Lione

(57) ABSTRACT

A contact type thin film magnetic head and method of using the same are provided. The contact type thin film magnetic head comprises a head element that is provided on a disk-facing surface of a slider, a magnetic disk, and heating elements disposed in a plane position different from that of the head element. A protective layer covers the heating elements and the head element. The heating elements and the protecting layer are formed on the disk-facing surface of the slider. The protective layer protrudes further toward the magnetic disk than the head element.

2 Claims, 5 Drawing Sheets

CONTACT TYPE THIN FILM MAGNETIC HEAD WITH HEATERS FOR DISTANCE CONTROL

CROSS REFERENCE TO RELATED APPLICATION

This application claims the benefit of Japanese patent application No. 2005-332098 filed Nov. 16, 2005, which is hereby incorporated by reference.

BACKGROUND

1. Field

The present embodiments relate to a contact type thin film magnetic head.

2. Related Art

In the related art, a thin film magnetic head is mounted on a hard disk device that includes a slider that has a magnetoresistance effect element or an inductive element or the like mounted therein. The slider floats due to an airflow that is generated on a surface of a magnetic disk. The slider remains afloat during the operation of recording and regenerating. Generally, a floating amount (the distance between the slider and the disk) of the head during the operation of recording and regenerating is small as possible, in order to improve surface recording density. In an effort to further improve recording density of the above-describe floating type thin film magnetic head, a contact type thin film magnetic head that remains {floating amount is zero} in contact with a magnetic disk during the operation of recording and regenerating has been developed.

A loading/unloading type has been known in that the contact type thin film magnetic head remains at a retreated position outside of the magnetic disk when recording and regenerating is not operating. The contact type thin film magnetic head is mounted on the magnetic disk when the recording and regenerating operations start, and after the recording and regenerating operations is terminated, the magnetic head returns from the magnetic disk to the retreated position. However, the position of the slider is unstable during loading and unloading. If the slider is loaded on the magnetic disk or unloaded therefrom in an unstable position, an unexpected frictional force is generated between the slider and the magnetic disk, such that the magnetic disk stops rotating. Further, the magnetic head and the magnetic disk are likely to be damaged.

SUMMARY

The present embodiments may obviate one or more of the limitations of the related art. For example, in one embodiment, a contact type thin film magnetic head is capable of performing loading or unloading operation, without generating excessive frictional force between a rotating magnetic disk and a slider.

A frictional force generated between a slider and a magnetic disk is decreased if a contact area of the slider and the magnetic disk is reduced, during loading or unloading.

In one embodiment, a contact type thin film magnetic head includes a head element that is provided on a disk-facing surface of a slider that moves from a retreated position outside a magnetic disk onto a surface of the magnetic disk and performs recording and regenerating operations while in contact with a magnetic disk. Heating elements and a protective layer that cover the heating elements and the head element are formed on the disk-facing surface of the slider. The heating element is disposed in a plane position different from that of the head element. The protective layer in the vicinity of the heating elements protrudes further toward the magnetic disk than the head element, as current is supplied to the heating elements for a predetermined time during loading or unloading.

In one embodiment, since the slider comes into contact with the magnetic disk at protrusions of a protective layer of a magnetic disk, a contact area of the slider and the magnetic disk is reduced. In this embodiment, even though the slider is loaded on the magnetic disk or unloaded therefrom in an unstable position, a frictional force generated between the slider and the magnetic disk decreases. Thus, it is possible to prevent damage to the slider and the magnetic disk.

In another embodiment, a pair of the heating elements is disposed at both sides in a track width direction of the head element. The heating elements are provided on both sides in the track width direction of the head element. The one side first comes in contact with the magnetic disk during loading.

In another embodiment, the heating elements are disposed on the magnetic gap layer at both sides in the track width direction of the upper core layer when the head element includes a recording element that has a lower core layer and an upper core layer that are laminated with a magnetic gap layer interposed therebetween.

DETAILED DESCRIPTION

Figure 1:
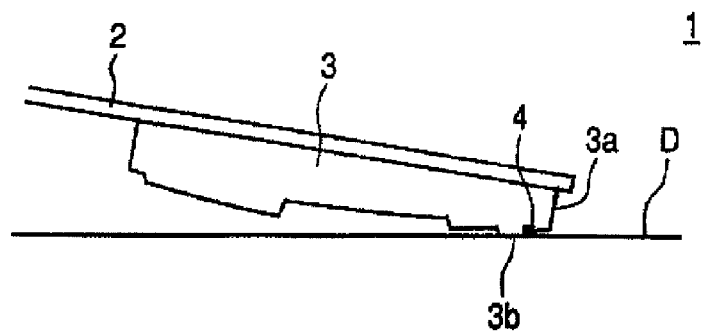
FIG. 1 is a schematic view that illustrates a contact type thin film magnetic head.

FIGS. 1 to 4 illustrate a contact type thin film magnetic head according to exemplary embodiments. In each drawing, the X direction is a track width direction, the Y direction is a height direction, and the Z direction is a movement direction of a magnetic disk (recording medium).

The contact type magnetic head 1 (hereinafter, referred to as 'thin film magnetic head') includes a slider 3 which is fixedly bonded to a free end of the flexure 2 formed of a flexible metallic thin plate (i.e., stainless). The slider 3 is formed of a ceramic material such as alumina titanium carbide, and a head element 4 is formed at one end surface 3a of the slider 3. The head element 4 is an integrated type head element in which a regenerating element R and a recording element W are laminated. The thin film magnetic head 1 remains at a retreated position outside the magnetic disk D when the recording and regenerating operations are not operating. Alternatively, the thin film magnetic head 1 is mounted on the magnetic disk D when the recording and regenerating operations is started.

In one embodiment, as shown in FIG. 1, the head element 4 remains in contact with the magnetic disk D during the recording and regenerating operations. After the recording and regenerating operations are terminated, the magnetic head 1 returns from the magnetic disk D to the retreated position outside the magnetic disk D.

Figure 2:
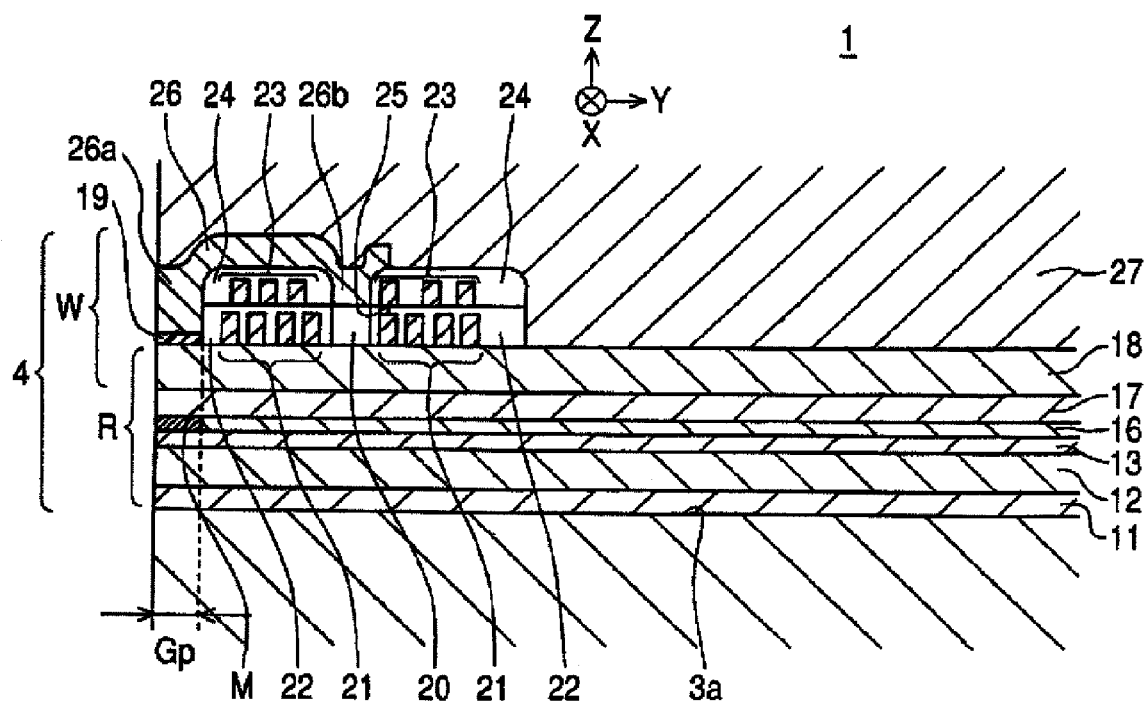
FIG. 2 is a cross-sectional view that illustrates a laminated structure of the contact type thin film magnetic head according to one embodiment, taken along the center of a head element.

In one embodiment, as shown in FIG. 2, an alumina undercoating film 11, a lower shield layer 12, a lower gap layer 13, and a multilayer film M, which shows magnetoresistance effect, are sequentially formed on the end surface 3a of the slider 3 in a laminated direction. On the lower gap layer 13, a hard bias layer 14 and an electrode layer 15 are further laminated at both sides of the multilayer film M in the track width direction, and an insulating layer 16 is formed in a height direction behind the multilayer film M. The lower shield layer 12 is formed of a soft magnetic, for example, Permalloy, and the lower gap layer 13 is formed of a nonmagnetic insulating material, for example, alumina.

The multilayer M is exposed to a surface (disk-facing surface) that faces the magnetic disk D. When currents are allowed to flow through the electrode layers 15 that are connected to both sides of the multilayer film M in the track width direction, a resistance value changes according to a leakage magnetic field caused by the magnetic disk D. The thin film magnetic head 1 reads magnetic information that is recorded in the magnetic disk D in accordance with changes of resistance value of the multilayer film M. The multilayer film M may be formed of a TMR (Tunneling Magnetoresistance) film or a GMR (Giant Magnetoresistance) film or an AMR (Anisotropic Magnetoresistance) film.

Figure 4:
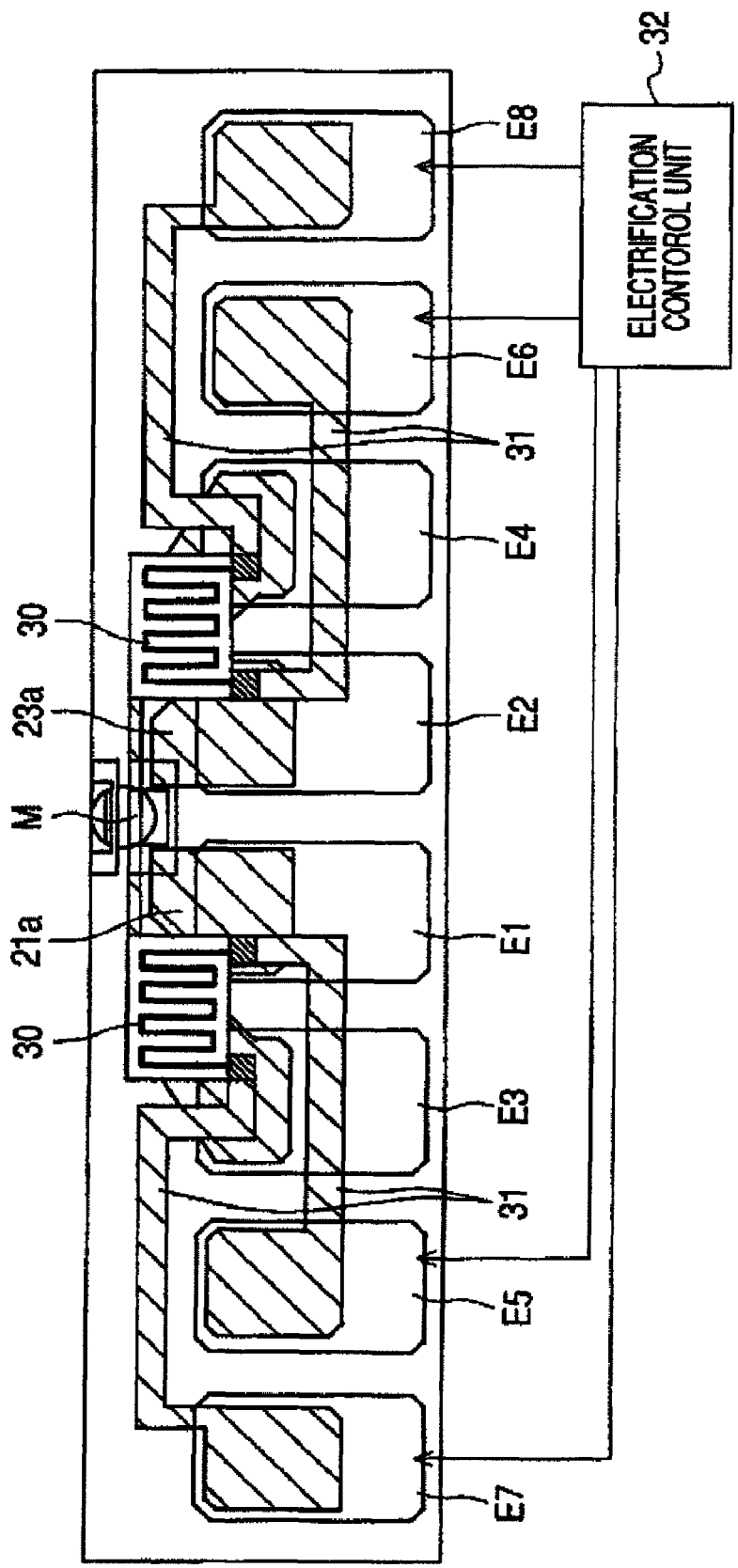
FIG. 4 is a perspective view that illustrates parts of the contact type thin film magnetic head of FIG. 2, as seen from an end surface thereof.

In one embodiment, the electrode layer 15 is connected to the multilayer film M at both sides thereof in the track width direction, and extends in the height direction from the disk-facing surface, and is connected to electrode pad layers E3 and E4 at the highest layer of a laminated film which is formed on the end surface 3a of the slider 3 (refer to FIG. 4). The electrode layer 15 and the electrode pad layers E3 and E4 are formed of conductive materials that have low electrical resistance, for example, Cu or Au.

In one embodiment, an upper shield layer 18 is formed on the multilayer M and the electrode layer 15 with an upper gap layer 17 interposed therebetween. The upper gap layer 17 is formed of a nonmagnetic material, for example, alumina, and the upper shield layer 18 is formed of a soft magnetic material, for example, Permalloy. Although not shown, an insulating layer is formed around the upper shield layer 18.

The regenerating element R includes a structure from the lower shield layer 12 to the upper shield layer 18. In one embodiment, the upper shield layer 18 of the regenerating element R also functions as a lower core layer of the recording element W. Alternatively, a piggyback type can be used to include the upper shield layer and the lower core layer separately.

A magnetic gap layer 19 is provided on the lower core layer 18 so as to be exposed to the disk-facing surface. A gap depth Gp of the thin film magnetic head 1 is determined in accordance with the dimension of the magnetic gap layer 19 in the height direction. The magnetic gap layer 19 is formed of a nonmagnetic material. On the lower core layer 18, a magnetic connection portion 20 which magnetically connects the lower core layer 18 and the upper core layer 26 is formed so as to be located behind the magnetic gap layer 19 in the height direction. A first coil layer 21 is formed so as to be spirally wound around the magnetic connection portion 20, and a first non-magnetic insulating layer 22 is formed so as to cover the first coil layer 21 and gaps between it pitches. The magnetic connection portion 20 and the first nonmagnetic insulating layer 22 share the top surface with the magnetic gap layer 19.

On the first nonmagnetic insulating layer 22, a second coil layer 23 is formed so as to be spirally wound in an opposite direction to the wound direction of the first coil layer 21. A second nonmagnetic insulating layer 24 is formed so as to cover the second coil layer 23 and gaps between its pitches. The first coil layer 21 and the second coil layer 23 are electrically connected to each other with a contact 25 interposed therebetween, the contact 25 penetrating the first nonmagnetic insulating layer 22.

In one embodiment, as shown in FIG. 4, the first coil layer 21 and the second coil layer 23 are connected to electrode pad layers E1 and E2 with a first coil lead layer 21a and a second coil lead layer 23a interposed therebetween. The first coil lead layer 21a and the second coil lead layer 23a are formed by plating on the same surface as the first coil layer 21, when the first coil layer 21 is formed by plating. The second coil lead layer 23a is connected to the second coil layer 23 with a contact (not shown) interposed therebetween, the contact penetrating the first nonmagnetic insulating layer 22. The shape of the first coil layer 21 and the second coil layer 23 is not limited, for example, they can be formed in a solenoidal shape. The magnetic connection portion 20 is formed of a soft magnetic material, for example, Permalloy. The first nonmagnetic insulating layer 22 and the second nonmagnetic insulating layer 24 are formed of, for example, alumina. The first coil layer 21, the second coil layer 23, the contact 25, the first coil lead layer 21a, the second coil lead layer 23a, and the electrode pads E1 and E2 are formed of conductive materials having low electrical resistance, for example, Cu.

Figure 3:
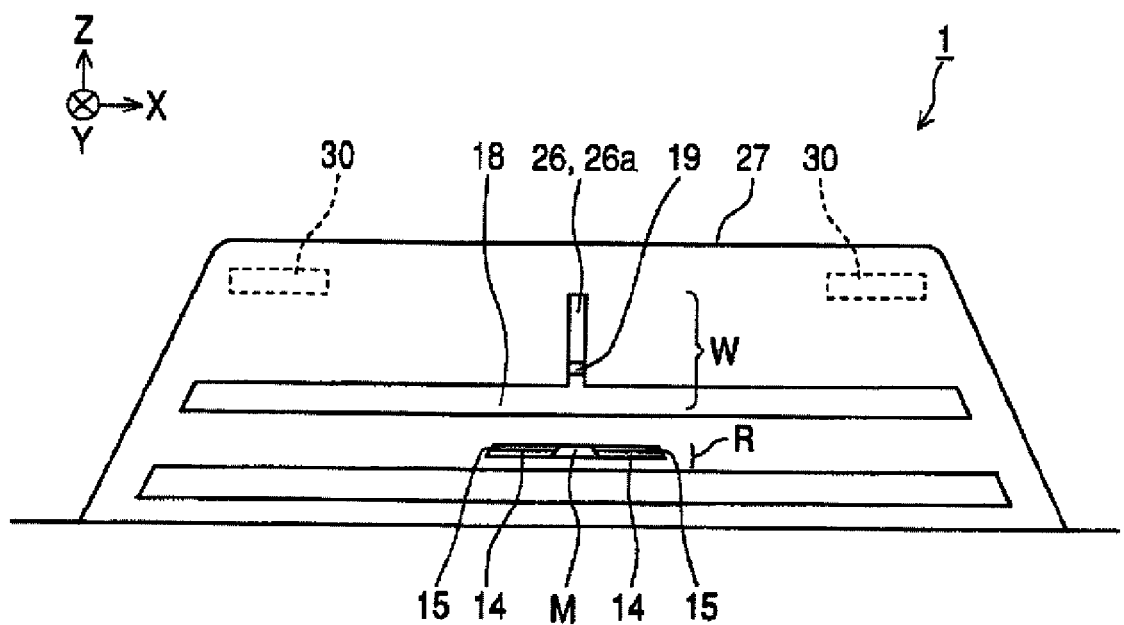
FIG. 3 is a cross-sectional view that illustrates a laminated structure of the contact type thin film magnetic head of FIG. 2, as seen from a disk facing surface.

On the second magnetic insulating layer 24, an upper core layer 26 is in contact with the magnetic gap layer 19 at a leading end portion 26a which is exposed to the disk facing surface, and is in contact with the magnetic connection portion 20 at a base 26b behind the disk facing surface in the height direction. As shown in FIG. 3, the leading end portion 26a of the upper core layer 26 is decreased in width in accordance with the track width of the magnetic disk D. The upper core layer 26 is formed of a soft magnetic material, for example, Permalloy.

The recording element W includes a structure from the lower core layer 18 to the upper core layer 26. A protective surface 27 covers the vicinity of the upper coil layer 26, the second nonmagnetic insulating layer 24, and the top surface of the lower coil layer 18.

Figure 5:
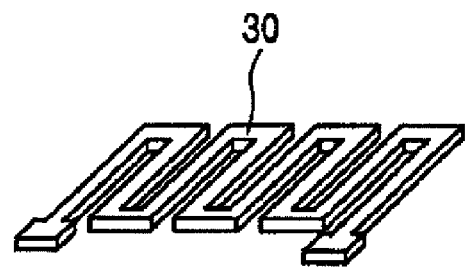
FIG. 5 is a perspective view that illustrates a heating element according to an example.

In one embodiment, the thin film magnetic head 1 includes a heating element 30 (FIGS. 3 to 5) that is disposed in a plane position different from that of the head element 4. FIG. 4 is a perspective view partially illustrating the thin film magnetic head 1, as seen from the end surface 3a of the slider 3. The heating elements 30 are formed over the magnetic gap layer 19 at both sides of the upper core layer 26 in the track width direction, and are covered by the protective layer 27 together with the upper core layer 26. For example, in one embodiment, the pair of heating elements 30 is located on the same surface as the upper core layer 26 or above the upper core layer 26. The pair of heating elements 30 emits heat when electrically connected to an electrification control unit 32 by way of the electrode pad layers E5 to E8 and lead layers 31 for a heating element 31 shown in FIG. 4. The heating element 30 is formed together with the upper core layer 26 by a frame plating method using any one of a group composed of, for example, NiFe, CuNi, or CuMn. It is possible to increase an amount of heat generated from the heating elements 30 by using a thick film having a thickness in the range of 1 µm to 10 µm. For example, as shown in FIG. 5, the heating element 30 is formed in a meandering shape, when seen in the plane view.

In one embodiment, the pair of heating elements 30 generates heat and transfers the heat toward the disk-facing surface, thus intensively heating portions of the protective layer 27 in the vicinity of the heating element 30. Accordingly, the portions of the protective layer 27 in the vicinity of the heating element thermally expand, and protrude further toward the magnetic disk D than the head element 4, thus forming protrusions α in a horn shape at both sides of the head element 4 in the track width direction (refer to FIG. 6). For example, if the protective layer 27 partially protrudes toward the magnetic disk D, it is possible to decrease a contact area where the slider 3 and the magnetic disk D come in contact with each other. The electrification control unit 32 is electrically connected to the pair of heating elements 30, during the loading or unloading of the thin film magnetic head 1.

Figure 6A:
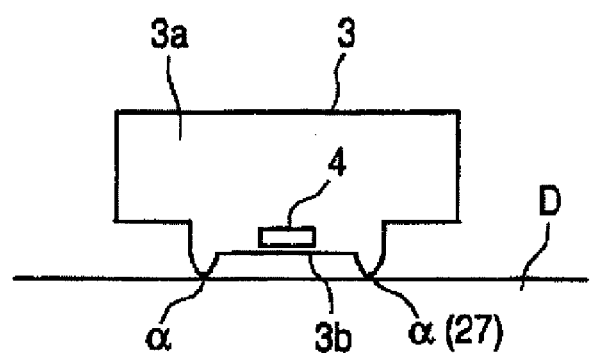
FIG. 6A is a cross-sectional view that illustrates a slider that is loaded or unloaded in a stable position.
Figure 6B:
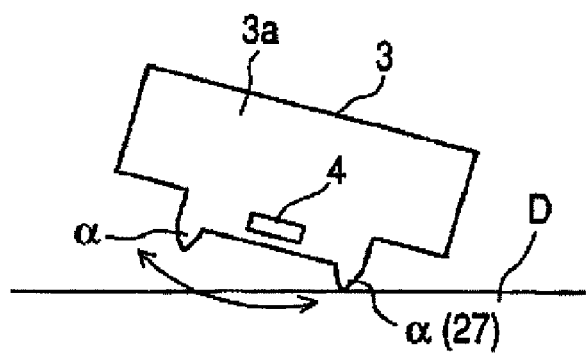
FIG. 6B is a cross-sectional view that illustrates a slider that is loaded or unloaded in an ideal position.
Figure 7:
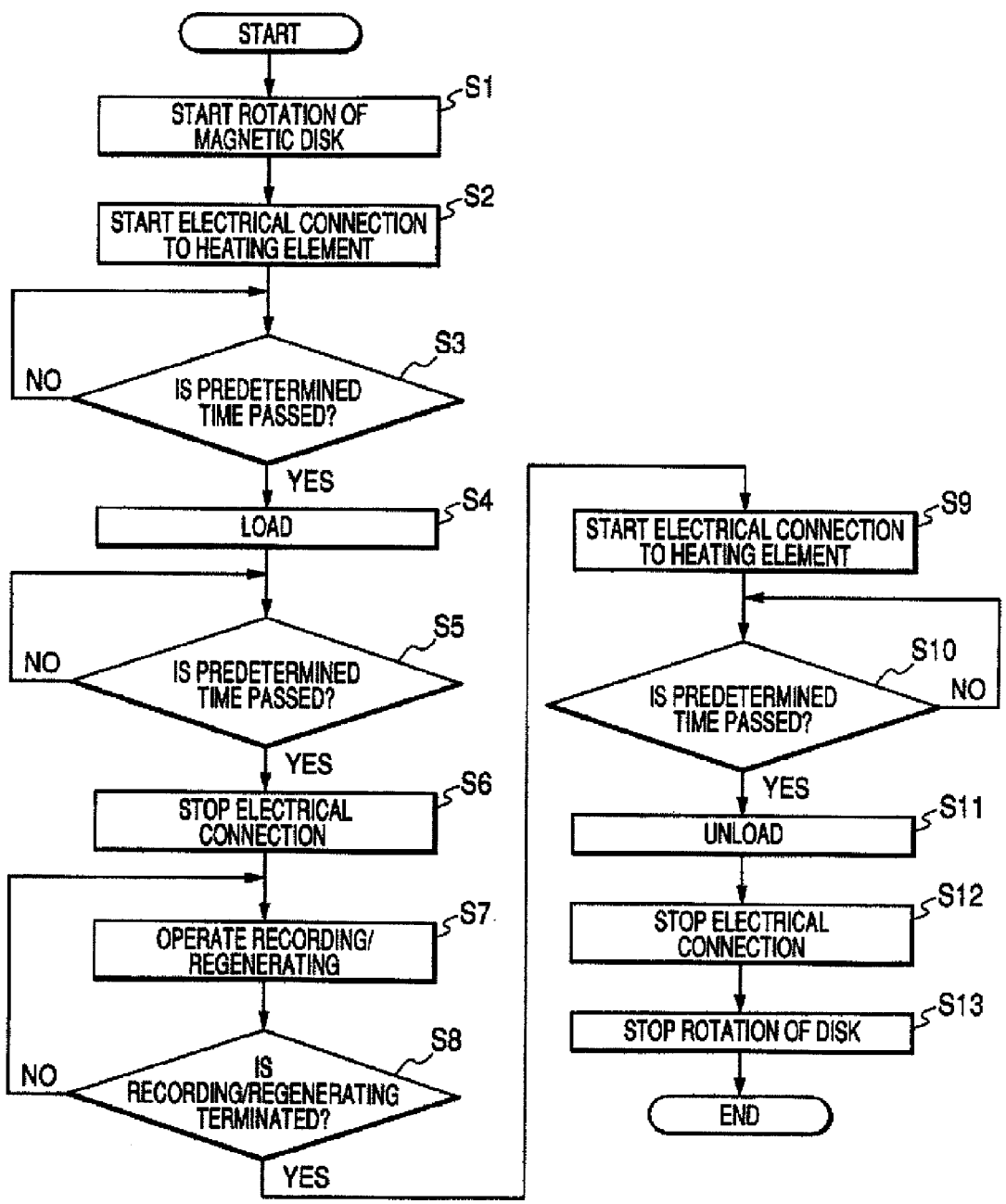
FIG. 7 is a flow chart related to recording/regenerating of the contact type thin film magnetic head of FIG. 2.

In one embodiment, as shown in FIGS. 6 and 7, the electrification control unit 32 is electrically connected to the pair of heating elements 30, during the loading and unloading of the thin film magnetic head 1.

Before starting (before the recording and regenerating operations), the thin film magnetic head 1 is held at a retreated position outside the magnetic disk D, and the magnetic disk D stops rotating.

Alternatively, after starting (i.e. a command is given to operate the recording and regenerating operations), the magnetic disk D starts rotating (S1), the electrification control unit 32 becomes electrically connected to the pair of heating elements 30 and the pair of heating elements 30 and a predetermined time passes (S2, S3; N). When the electrification control unit 32 is electrically connected to the pair of heating elements 30, the portions of the protective layer 27 in the vicinity of the heating elements are immediately heated, thus protruding toward the magnetic disk D. The passing for a predetermined time in act S3 is required for reliably generating the pair of protrusions α on the disk-facing surface 3b of the slider 3, at both sides of the head element 4, as shown in FIG. 6A.

When a predetermined time passes (S3; Y), the thin film magnetic head 1 is moved onto the magnetic disk D from the retreated position (S4). The thin film magnetic head 1 comes into contact with the magnetic disk D from a time point when the slider 3 is mounted on the magnetic disk D, and moves up to a predetermined movement start point while remaining in contact with the magnetic disk D. As shown in FIG. 6A, the magnetic disk D is in contact with only the protrusions (protective layer 27) α that protrude from the disk-facing surface 3b, at both sides of the head element 4, and the contact area of the magnetic disk D and the thin film magnetic head 1 is small.

As shown in FIG. 6B, even though the slider 3 is not mounted on the magnetic disk D in a stable position, for example, being loaded in an unstable position thereon, a frictional force generated between the thin film magnetic head 1 and the magnetic disk D is kept from increasing and does not stop the rotation of the magnetic disk D. In this embodiment, for example, it is possible to prevent damage to the thin film magnetic head 1 and the magnetic disk D.

When the thin film magnetic head 1 is loaded, a predetermined time passes until the slider 3 is stably positioned (S5; N); and then the electrification control unit 32 is electrically disconnected from the pair of heating elements 30 (S5; Y, S6), and starts recording/regenerating (S7). When the electrification control unit 32 is electrically disconnected from the pair of heating elements 30, the protective layer 27 is cooled by the air, and the protrusions α of the disk-facing surface 3b disappear. Alternatively, the disk-facing surface 3b of the slider 3 becomes flat, and the recording of the head element 4 is operated while the disk-facing surface 3b is in contact with the magnetic disk D. In one embodiment, since the distance from the head element 4 to the magnetic disk D is short, the thin film magnetic head operates reading/writing better, as compared to floating thin film magnetic head in the related art.

When recording/regenerating is terminated (S8; Y), the electrification control unit 32 starts to be electrically connected to the pair of heating elements 30 (S9), and a predetermined time passes until the pair of protrusions α is formed on the disk-facing surface 3b of the slider 3 (S10; N). As the electrification control unit 32 starts to be electrically connected to the pair of heating elements 30, the portions of protective layer 27 in the vicinity of the heating elements are heated, thus protruding toward the magnetic disk D and forming the pair of protrusions α at both sides of the head element 4 in the track width direction.

In one embodiment, if a predetermined time passes (S10; Y), the thin film magnetic head 1 moves from the magnetic disk D to the retreated position outside the magnetic disk D (S11). As shown in FIG. 6A, the magnetic disk D is in contact with only the protrusions (protective layer 27) α protruding from the disk-facing surface 3b, at both sides of the head element 4, and the contact area of the magnetic disk D and the thin film magnetic head 1 is small. As shown in FIG. 6B, even though the slider 3 cannot be mounted on the magnetic disk D in a stable position, for example, being unloaded in an unstable position, a frictional force generated between the thin film magnetic head 1 and the magnetic disk D is kept from increasing and does not stop the rotation of the magnetic disk D. In this embodiment, it is possible to prevent damage to the thin film magnetic head 1 and the magnetic disk D.

In one embodiment, when the thin film magnetic head 1 returns to the retreated position, the electrification control unit 32 is electrically disconnected from the pair of heating elements 30 (S12). When the electrification control unit 32 is electrically disconnected from the pair of heating elements 30, the protective layer 27 is cooled by the air, and the protrusions α of the disk-facing surface 3b disappear. In this embodiment, the magnetic disk D stops rotating (S13), thus returning to a position before starting (operating recording/regenerating).

In one embodiment, the disk-facing surface of the slider 3 remains in contact with the magnetic disk D during the recording and regenerating operations, thereby improving performance of the recording and regenerating operations. During loading or unloading of the slider 3 in an unstable position, by forming the protrusions α on the disk-facing surface 3b, the slider 3 can be brought in contact with the magnetic disk D at the protrusions α, for example, decreasing the contact area. Even though the slider 3 is unstably positioned during loading or unloading, a frictional force generated between the thin film magnetic head 1 and the magnetic disk D is kept from increasing and does not stop the rotation of the magnetic disk D. In this embodiment, the thin film magnetic head 1 and the magnetic disk are prevented from being damaged.

In one embodiment, the pair of heating elements 30 are formed at both sides of the head element 4 in the track width direction; however, the heating element 30 can be formed at only one side of the head element 4. In this embodiment, it is preferable that the heating elements 30 are provided at one side of the head element 4, for example, when the thin film magnetic head is loaded, the one side of the head element 4 comes in contact with the magnetic disk D before the other side.

In one embodiment, the heating element 30 is interposed between the gap layer 19 and the protective layer 27. Alternatively, the heating element 30 is embedded in the protective layer 27.

In the above-described embodiments, a regenerating element that has a laminated structure in which a recording element is laminated on the regenerating element is used as a head element. However, the present embodiments may be applied to a contact type thin film magnetic head that has either a regenerating element or a recording element.

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

The invention claimed is:

1. A contact type thin film magnetic head comprising:
a head element that is provided on a trailing end of a slider; the slider being operative to move from a retreated position outside a magnetic disk onto a surface of the magnetic disk and perform recording and regenerating operations while coming into contact with the magnetic disk;
a heating element disposed in a plane position different from that of the head element; and
a protective layer that covers the heating element and the head element,
wherein the heating element and the protecting layer are formed on the trailing end of the slider,
the protective layer protrudes further toward the magnetic disk than the head element, as current is supplied to the heating element,
the head element includes a recording element which has a lower core layer and an upper core layer that are laminated with a magnetic gap layer therebetween, wherein a leading end portion of the upper core layer is decreased in width in accordance with a track width of the magnetic disk,
wherein the head element has a first side in the track width direction and a second side in the track width direction,
wherein the first side in the track width direction is provided with the heating element and the second side in the track width direction is provided with no heating element, wherein the first side in the track width direction comes over the magnetic disk earlier than the second side in the track width direction, the heating element emits heat at the first side in the track width direction to form the only one protrusion that protrudes towards the magnetic disk, and the only one protrusion comes into contact with the magnetic disk, during loading of the head element,
the head element further includes a regenerating element which has a multilayer film which shows magnetoresistance effect, and
the heating element is spaced apart from the leading end portion of the upper core and the multilayer film in the track width direction.

2. The contact type thin film magnetic head according to claim 1,
wherein the head element includes the recording element that is laminated on the regenerating element.

* * * * *